(12) United States Patent
Lim et al.

(10) Patent No.: US 12,185,029 B2
(45) Date of Patent: Dec. 31, 2024

(54) APPARATUS AND METHOD FOR TRANSMITTING IMAGES AND APPARATUS AND METHOD FOR RECEIVING IMAGES

(71) Applicant: HANWHA TECHWIN CO., LTD., Seongnam-si (KR)

(72) Inventors: Jeong Eun Lim, Seongnam-si (KR); Jin Ook Hur, Seongnam-si (KR); Seung In Noh, Seongnam-si (KR)

(73) Assignee: HANWHA VISION CO., LTD., Suwon-si (KR)

( * ) Notice: Subject to any disclaimer, the term of this patent is extended or adjusted under 35 U.S.C. 154(b) by 48 days.

(21) Appl. No.: 18/080,426

(22) Filed: Dec. 13, 2022

(65) Prior Publication Data
US 2023/0188679 A1 Jun. 15, 2023

(30) Foreign Application Priority Data

Dec. 13, 2021 (KR) .................. 10-2021-0177566
Dec. 13, 2022 (KR) .................. 10-2022-0173363

(51) Int. Cl.
H04N 7/18 (2006.01)
G06V 20/40 (2022.01)
G06V 20/52 (2022.01)

(52) U.S. Cl.
CPC ............ *H04N 7/181* (2013.01); *G06V 20/41* (2022.01); *G06V 20/49* (2022.01); *G06V 20/52* (2022.01); *G06V 2201/10* (2022.01)

(58) Field of Classification Search
CPC ........ H04N 7/181; H04N 7/183; G06V 20/41; G06V 20/49; G06V 20/52; G06V 2201/10
USPC ...................................... 348/143
See application file for complete search history.

(56) References Cited

U.S. PATENT DOCUMENTS

| 9,264,765 B2* | 2/2016 | Sasaki .............. H04N 21/21805 |
| 2013/0322687 A1* | 12/2013 | Kritt ...................... H04N 7/181 382/103 |
| 2014/0245367 A1* | 8/2014 | Sasaki ................ H04N 21/2343 725/109 |
| 2020/0193608 A1* | 6/2020 | Sato ....................... G06V 20/46 |
| 2021/0110163 A1* | 4/2021 | Culbertson .......... G06V 10/762 |
| 2021/0319223 A1 | 10/2021 | Nagata et al. |

(Continued)

FOREIGN PATENT DOCUMENTS

| CN | 110602554 A | 12/2019 |
| JP | 4168940 B2 | 10/2008 |
| KR | 10-2179436 B1 | 11/2020 |

OTHER PUBLICATIONS

Extended European Search Report issued on Apr. 3, 2023 for European Patent Application No. 22213057.7.

*Primary Examiner* — Marnie A Matt
(74) *Attorney, Agent, or Firm* — Sughrue Mion, PLLC

(57) ABSTRACT

An image transmission method performed by instructions in an image transmission device including a processor and a memory storing the instructions executable by the processor includes, receiving a video, recognizing an object from the received video, generating metadata of the recognized object, calculating a score of the recognized object using the generated metadata; selecting the recognized object as a main object when the score exceeds a reference value, transmitting the metadata on the selected main object, and transmitting one of an image frame including the main object in the video and a best shot cropped from the image frame.

17 Claims, 13 Drawing Sheets

(56) References Cited

U.S. PATENT DOCUMENTS

2022/0092866 A1* 3/2022 Inoue .................. G06V 10/141
2022/0309789 A1* 9/2022 Shu ....................... G06V 20/41

* cited by examiner

APPARATUS AND METHOD FOR TRANSMITTING IMAGES AND APPARATUS AND METHOD FOR RECEIVING IMAGES

TECHNICAL FIELD

The present disclosure relates to a surveillance system, and more particularly, to a device and method of selecting, among objects recognized from an input image, a main object representing the recognized objects and searching for and displaying the selected main object.

BACKGROUND ART

A closed-circuit television (CCTV) capable of analyzing an object has a function of extracting metadata obtained through object recognition within image data in addition to the image data when collecting the image data. These metadata are used for a user to search for image data, and are also used when an alarm is generated through an application by triggering an event.

However, since a conventional object recognition technology applies a uniform criterion to a plurality of videos, the number of recognized objects is vast, such that it is difficult for the user to monitor or perform a detailed search for objects satisfying specific conditions from the recognized objects.

In this regard, a video synopsis technology that synopsizes a vast amount of video into a small number of images or a so-called best shot technology that cuts out and provides a partial image best representing a specific object in a video has been proposed.

However, since such a best shot technology generates a partial image corresponding to a best shot in a camera device and provides the partial image regardless of requirements of back-end devices, the requirements of the back-end devices are not reflected in generating the best shot in various back-end devices. In addition, when specifications of the camera device are not sufficient, there is also a problem that basic performance of the camera device is deteriorated due to a calculation burden for generating the best shot.

RELATED ART

Patent Document

Japanese patent No. 4168940 (registered on Aug. 15, 2008)

DISCLOSURE

Technical Problem

Aspects of the present disclosure provide an image transmission device and method and an image reception device and method capable of determining a criterion for selecting a main object, selecting a set of metadata to be transmitted, or selecting a target to be transmitted among image frames and best shots, variably according to a back-end request or a resource condition.

Aspects of the present disclosure also provide an image transmission device and method and an image reception device and method capable of performing an intuitive and quick search based on the metadata, the image frame, and the transmitted best shot according to a user's search command.

However, aspects of the present invention are not restricted to those set forth herein. The above and other aspects will become more apparent to one of ordinary skill in the art to which the disclosure pertains by referencing the detailed description of the present invention given below.

Technical Solution

According to an aspect of an exemplary embodiment, there is provided an image transmission method performed by instructions in an image transmission device including a processor and a memory storing the instructions executable by the processor, the image transmission method including: receiving a video; recognizing an object from the received video; generating metadata of the recognized object; calculating a score of the recognized object using the generated metadata; selecting the recognized object as a main object when the score exceeds a reference value; transmitting the metadata on the selected main object; and transmitting one of an image frame including the main object in the video and a best shot cropped from the image frame.

The recognizing of the object may include recognizing the object through motion sensing or artificial intelligence learning.

The main object may be selected for each different recognized object, and the metadata includes an identifier for identifying identity of the main object.

The main object may be selected within a limited number for each object having the same identifier.

The image frame may be a key frame included in the video, and the key frame may be a frame reconstructed without referring to other image frames.

The metadata used to calculate the score includes a plurality of metadata, and the score may be calculated as a weighted sum obtained by multiplying the plurality of metadata by respective weights and then summing multiplication result values.

The plurality of metadata may include one or more of a probability of the object, a type of the object, a property of the object, a sub-property of the object, an appearance time of the object, and a size and a position of the object.

At least one of the reference value, the plurality of metadata, and the weights may be changed according to a current resource of the image transmission device or a back-end request received from an image reception device connected to the image transmission device through a network.

A set of the transmitted metadata may be changed according to a current resource of the image transmission device or a back-end request received from an image reception device connected to the image transmission device through a network.

One of the image frame including the main object and the best shot may be selected according to a current resource of the image transmission device or a back-end request received from an image reception device connected to the image transmission device through a network and may be transmitted to the image reception device.

According to another aspect of an exemplary embodiment, there is provided an image display method performed by instructions in an image reception device including a processor and a memory storing the instructions executable by the processor, the image display method including: receiving metadata on a main object selected in an image transmission device connected to the image reception device through a network; receiving one of an image frame including the main object in a video obtained by the image transmission device or a best shot cropped from the image frame; generating a best shot by cropping a partial image occupied by the main object in the image frame using the metadata on the main object when the image frame including the main object is received; and displaying at least one of the received best shot and the cropped best shot on a screen.

The metadata may include an identifier for identifying identity of the main object, and the displaying includes collecting a limited number of the partial images for each object having a different identifier and displaying the collected partial images on the screen.

The image display method may further include, receiving an object search condition from a user; and filtering only partial images satisfying the object search condition among the partial images and displaying the filtered partial images on the screen.

The image display method may further include, receiving an object search condition and an environment condition from a user; and filtering the partial image and displaying the filtered partial image on the screen when the partial image satisfies the object search condition and the image frame including the partial image satisfies the environment condition.

The image display method may further include performing image analysis in order to identify identity of the main object, wherein the displaying includes collecting a limited number of the partial images for each object having a different identifier and displaying the collected partial images on the screen.

The image display method may further include transmitting a back-end request to the image transmission device, wherein the image frame including the main object, received from the image transmission device is changed according to the back-end request.

The image display method may further include transmitting a back-end request to the image transmission device, wherein a set of the metadata received from the image transmission device is changed according to the back-end request.

The image display method may further include transmitting a back-end request to the image transmission device, wherein it is determined whether the image frame including the main object is received or the best shot is received from the image transmission device according to the back-end request.

According to another aspect of an exemplary embodiment, there is provided an image surveillance method performed by instructions in an image surveillance system including a processor and a memory storing the instructions executable by the processor, the image surveillance method including: receiving a video; recognizing an object from the received video; generating metadata of the recognized object; calculating a score of the recognized object using the generated metadata; selecting the recognized object as a main object when the score exceeds a reference value; receiving the metadata on the selected main object and an image frame including the main object from in the video; generating a best shot by cropping a partial image occupied by the main object in the image frame using the metadata on the main object; and displaying the generated best shot on a screen.

Advantageous Effects

According to the present disclosure, by variably reflecting a current resource of an image transmission device and/or requirements of an image reception device in selecting a main object in the image transmission device, the main object may be selected so as to be most appropriate for a current situation, and metadata and an image condition be transmitted to the image reception device may be determined.

In addition, according to the present disclosure, the image transmission device may transmit metadata on the main object and an image frame including the main object and cropping of a best shot may be performed in the image reception device, and thus, a computational burden on the image transmission device such as a camera having low specifications may be decreased.

Further, according to the present disclosure, the image reception device may receive the metadata on the main object and the image frame itself including the main object, and thus, it is possible to perform a search in consideration of a situation of the main object as well as a property of the main object itself at the time of searching for the main object according to a user search condition.

MODE FOR INVENTION

Figure 1:
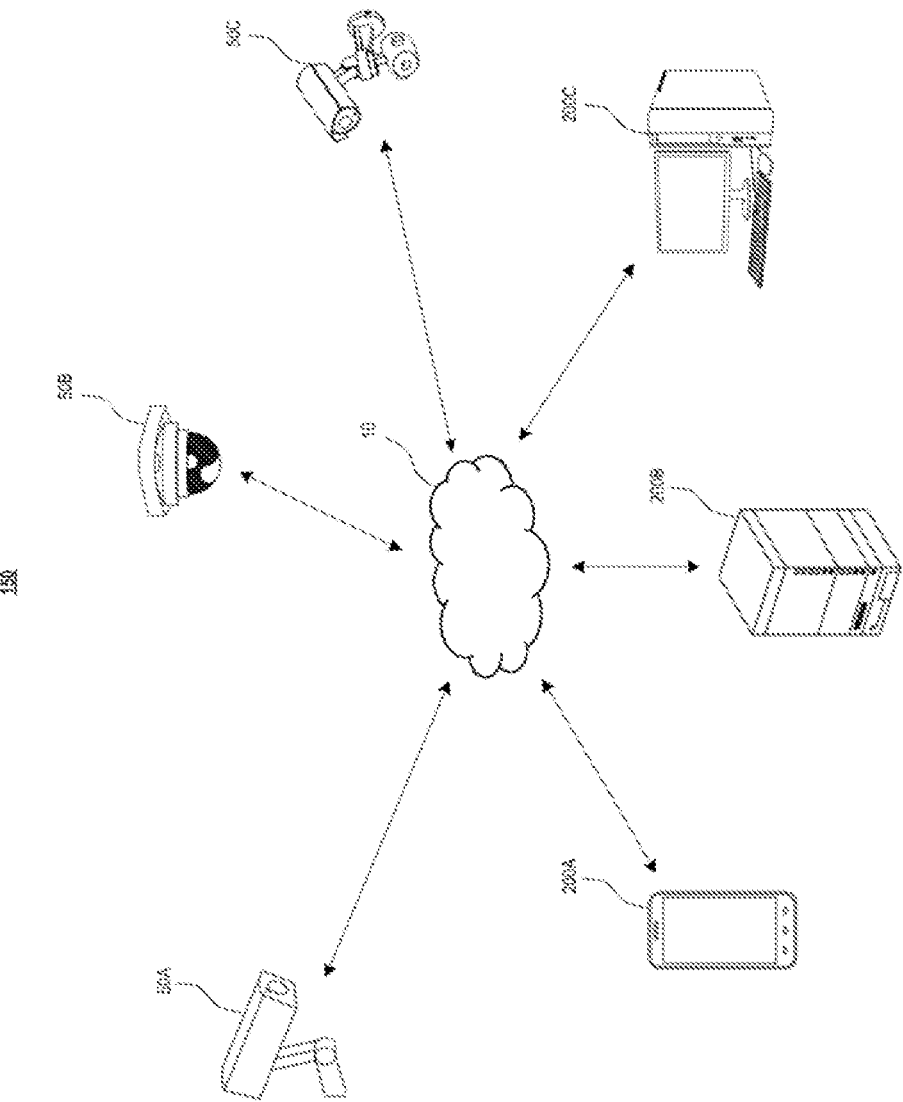
FIG. 1 is a diagram illustrating components of an image surveillance system according to an exemplary embodiment of the present disclosure.

Advantages and features of the disclosure and methods to achieve them will become apparent from the descriptions of exemplary embodiments herein below with reference to the accompanying drawings. However, the inventive concept is not limited to exemplary embodiments disclosed herein but may be implemented in various ways. The exemplary embodiments are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

FIG. 1 is a diagram illustrating components of an image surveillance system 150 according to an exemplary embodiment of the present disclosure. As illustrated in FIG. 1, the image surveillance system 150 may include a plurality of network camera devices 50: 50A, 50B, and 50C and various types of image reception devices 200: 200A, 200B, and 200C, and these devices may be connected to each other through a network 10 such as the Internet or an intranet.

The camera device 50 may be an electronic device for image capturing that is disposed at a fixed position in a specific place, may be an electronic device for image capturing that may move automatically or manually along a predetermined path, or may be an electronic device for image capturing that may be moved by a person, a robot, or the like. The camera device 50 may be an IP camera used by being connected to the wired or wireless Internet. The camera device 50 may be a PTZ camera having pan, tilt, and zoom functions. The camera device 50 may have a function of recording or photographing an area surveilled by the camera device 50. The camera device 50 may have a function of recording a sound generated in the area surveilled by the camera device 50. The camera device 50 may have a function of generating a notification for a change in motion, sound, or the like, or performing recording or photographing when the change in motion, sound, or the like, occurs in the area surveilled by the camera device 50.

In addition, the network 10 may include, for example, wired networks such as local area networks (LANs), wide area networks (WANs), metropolitan area networks (MANs), and integrated service digital networks (ISDNs) or wireless networks such as wireless LANs, code division multiple access (CDMA), Bluetooth, and satellite communication.

The image reception device 200 may be a device that receives and stores an image itself captured by the camera device 50 and/or an image obtained by editing the image. The image reception device 200 may analyze the received image so as to correspond to a purpose for which it receives the image. For example, the image reception device 200 may detect an object using an object detection algorithm in order to detect the object in the image. An artificial intelligence (AI)-based algorithm may be applied as the object detection algorithm, and may detect the object by applying a pre-learned artificial neural network model.

In addition, the image reception device 200 may analyze the received image to generate metadata and index information on the metadata. The image reception device 200 may analyze image information and/or sound information included in the received image together or separately to generate metadata and index information on the metadata.

The image reception device 200 may be implemented as, for example, a personal computer 200C or a mobile terminal 200A, and may be implemented as a computing device 200B operating as a cloud server or a network video recorder (NVR) for image surveillance. The image reception device 200 may be connected to the plurality of network camera devices 50 through the network 10 based on Internet protocol to receive captured images and metadata on the images from the plurality of network camera devices 50. In the present disclosure, an image is used as the meaning including a video, a still image, and a non-continuous moving image such as motion joint photographic experts group (MJPEG).

The plurality of network camera devices are network cameras capturing images, and may be network camera devices having an AI-based video analytic function or network camera devices having a motion-based motion sensing module.

The image surveillance system 150 may further include an external device (not illustrated) that may perform wired/wireless communication with the camera device 50 and/or the image reception device 200. The external device may transmit an information provision request signal for requesting the image reception device 200 to provide the entirety or a portion of the image to the image reception device 200. The external device may transmit an information provision request signal for requesting the image reception device to provide information on the presence or absence of an object, a moving speed of the object, a shutter speed adjustment value according to the moving speed of the object, a noise removal value according to the moving speed of the object, and the like, as a result of image analysis, to the image reception device. In addition, the external device may transmit an information provision request signal for requesting the image reception device 200 to provide the metadata obtained by analyzing the image and/or the index information on the metadata to the image reception device 200.

Figure 2:
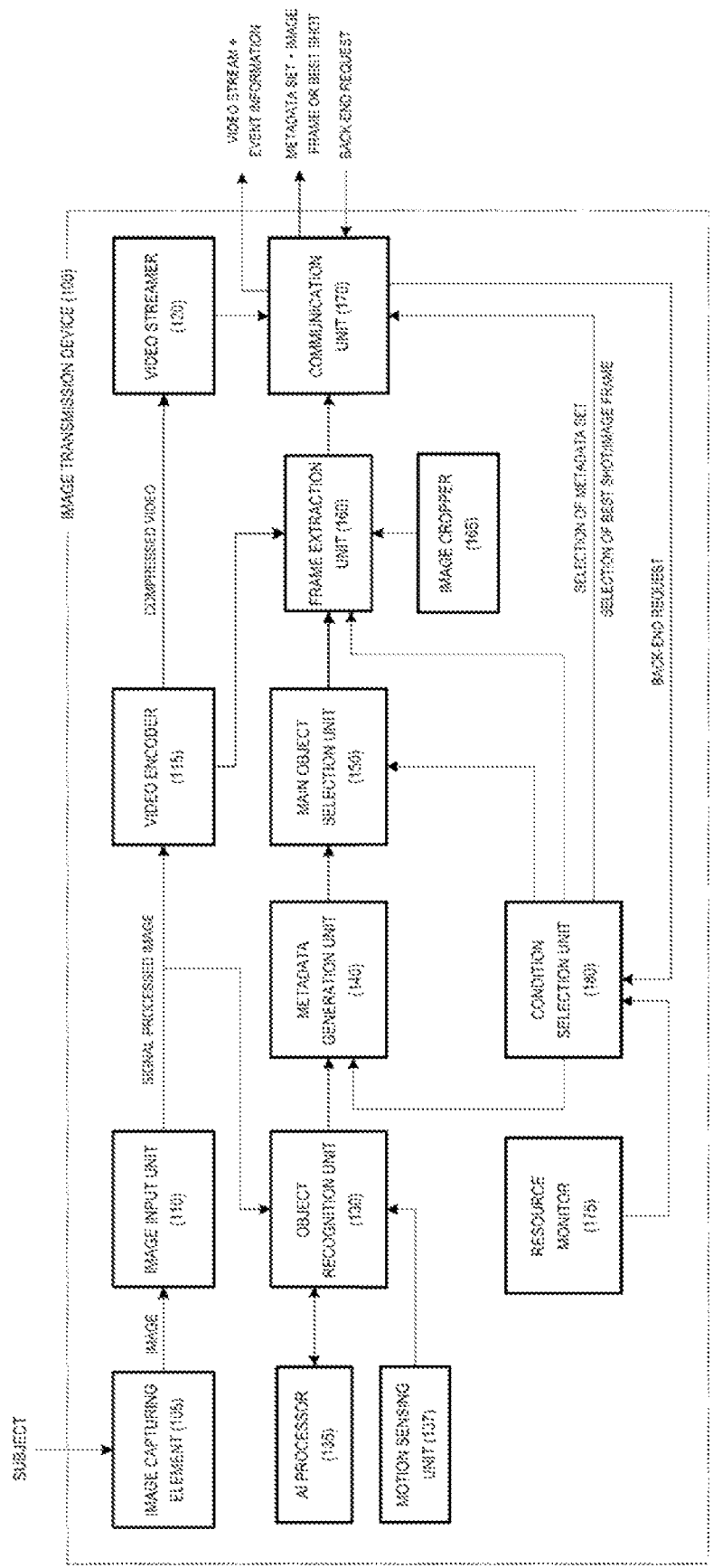
FIG. 2 is a block diagram illustrating components of an image transmission device according to an exemplary embodiment of the present disclosure.

FIG. 2 is a block diagram illustrating components of an image transmission device 100 according to an exemplary embodiment of the present disclosure.

The image transmission device 100 may be configured to include a processor and a memory storing instructions executable by the processor in terms of hardware. The image transmission device 100 may be the network camera device 50 described above, but is not limited thereto, and may also be implemented as a separate device that receives a video captured by an external image capturing device. Hereinafter, a case where the image transmission device 100 is implemented as the network camera device 50 will be described by way of example.

Referring to FIG. 2, for example, the image transmission device 100 may be configured to include an image capturing element 105, an image input unit 110, a video encoder 115, a video streamer 120, an object recognition unit 130, a metadata generation unit 140, a main object selection unit 150, a frame extraction unit 160, a communication unit 170, a resource monitor 175, and a condition selection unit 180.

The image capturing element 105 may obtain an image signal by capturing an image of a subject, and may be implemented as a charge coupled device (CCD) or a complementary metal-oxide semiconductor (CMOS). The image signal may be a still image or a moving image (video), but as an exemplary embodiment of the present disclosure, it will be described by way of example that the image signal is a video.

The image input unit 110 may receive the obtained image signal and perform appropriate signal processing on the image signal. In general, the signal processing may include image processing processes such as white balance, up/down sampling, noise reduction, and contrast improvement.

The video encoder 115 encodes the signal-processed image and outputs a compressed image frame. Specifically, the video encoder 115 may perform an operation of encoding the image obtained through the image capturing element 105 into a digital signal, and follow, for example, H.264, H.265, moving picture experts group (MPEG), motion joint photographic experts group (M-JPEG) standards, and the like.

Such an image frame may generally be divided into an inter frame that may be reconstructed only by referring to other image frames, and an intra frame that may be reconstructed without referring to other image frames. The intra frame may also be called a key frame, and the inter frame may be divided into a predictive-coded frame (P frame), a bipredictive-coded frame (B frame), and the like, according to the number of reference frames.

The video streamer 120 converts the compressed image frame into a video stream form and then transmits a video stream to the communication unit 170, and the video stream is finally transmitted over a network through the communication unit 170. In this case, the video stream may further include event information indicating an event generated in the compressed image frame together with the compressed image frame. Such event information may include recognition information of various situations occurring within the image frame, such as fire occurrence, a collision situation, intruder discovery, line crossing, and object count as known.

As such, the communication unit 170 is an interface communicatively connected to the image reception device 200 to transmit the video stream, and may be implemented with wired and wireless LAN (Local Area Network), Wi-Fi, ZigBee, Bluetooth, near field communication, and the like. In addition, the communication unit 170 may be configured to include a transmission control protocol/Internet protocol (TCP/IP) and a real-time streaming protocol (RTSP).

Meanwhile, the object recognition unit 130 recognizes an object from a video provided from the image input unit 110. The object recognition unit 130 may recognize the object through artificial intelligence learning based on a neural network model or through a motion vector-based algorithm. Accordingly, the object recognition unit 130 may operate in conjunction with an AI processor 135 or a motion sensing unit 137 supporting the artificial intelligence learning.

First, the AI processor 135 is for artificial intelligence image processing, and a deep learning-based object detection algorithm learned as an object of interest in the image obtained through the image capturing element 105 may be applied to the AI processor 135. The AI processor 135 may be implemented as a single module with a processor 260 that controls the entire system or be implemented as a module independent of the processor 260. In order to detect the object, a known You Only Lock Once (YOLO) algorithm may be applied. The YOLO algorithm is an AI algorithm widely used in a surveillance camera processing a real-time moving image because of its fast object detection speed. According to the YOLO algorithm, unlike other object-based algorithms (Faster R-CNN, R_FCN, FPN-FRCN, etc.), a bounding box defining a position of each object and a classification probability indicating what the object is are output as a result of resizing one input image and then passing the resized input image through a single neural network only once. Accordingly, finally, one object is recognized once through non-max suppression. The AI algorithm used in the AI processor 135 is not limited to the YOLO, and may be implemented as various deep learning algorithms.

Meanwhile, a learned model for object recognition applied herein may be a model trained by defining camera performance, movement speed information of an object recognizable without a motion blur phenomenon in a surveillance camera, and the like, as learning data. Accordingly, in the learned model, input data may be a moving speed of the object, and output data may be a shutter speed optimized for the moving speed of the object.

In addition, in order to recognize the object from the input image, a motion vector-based motion sensing scheme may be used instead of the AI algorithm as described above. For example, the motion sensing unit 137 may provide a motion vector-based motion sensing scheme such as support vector machine (SVM) and Adaboost, and the object recognition unit 130 may recognize the object from the input video using the motion vector-based motion sensing scheme. Such a motion vector-based algorithm may have an advantage that resource usage is smaller than that in the AI algorithm as described above and a processing speed is faster than that in the AI algorithm as described above, but may have disadvantages in terms of provision of abundant information or recognition accuracy according to various environments.

The metadata generation unit 140 generates metadata on the recognized object. The metadata refers to an information system capable of expressing the recognized object, and includes a type of the object, a probability of the object, a property of the object, and the like.

The type of the object refers to a classification that may distinguish objects such as a person, an animal, and a vehicle, and the probability of the object refers to a probability/possibility that the type of the object recognized by the object recognition unit 130 would have been accurately classified. Such a probability of the object is generally a value between 0% and 100%, and the greater the value of the probability of the object, the higher the possibility that the classification is accurate. The probability of the object may be obtained as a result of applying artificial intelligence learning or a motion sensing algorithm.

In addition, the property of the object refers to various features that change depending on the type of the object. For example, when the type of the object is a person, the property may be a gender, a hair, a top color, a bottom color, or the like, and when the type of the object is a vehicle, the property may be a vehicle type (a sport utility vehicle (SUV), a sedan, a sports vehicle, a two-wheeled vehicle, etc.), a vehicle color, or the like.

In addition, the metadata may further include an identifier (object ID) for identifying identity of a main object. The identifier does not express only the type and the property of the object, and indicates whether or not the object is the same object. Whether or not the object is the same object may be grasped through similarity in shape/movement of the object, tracking of a moving trajectory of the object, or the like.

In addition, the metadata may further include a sub-property of the object, an appearance time of the object, a size/position of the object, and the like. The sub-property of the object may be, for example, presence/absence of a license plate object when the object is the vehicle and whether or not the person has worn an accessory, glasses, or the like, when the object is the person.

The appearance time of the object refers to a time from an appearance of the object to a disappearance of the object, and may include a start time and an end time. Alternatively, the appearance time may be indicated only as a time when the object has simply started appearing.

The size of the object refers to horizontal/vertical sizes of the object within one image frame. Such a size may be defined as a horizontal pixel size and a vertical pixel size of the image frame including a plurality of pixels. The position of the object refers to a position occupied by the object within the image frame, and may be generally indicated by pixel coordinates of an upper left end of a bounding box surrounding the object.

In FIG. 2, the main object selection unit 150 calculates a score of the recognized object using the generated metadata, and selects the recognized object as the main object when the score exceeds a reference value. The main object as used herein refers to an object that may represent the object among a plurality of objects having identity, and occupies a partial area of at least one image frame. That is, the main object may be selected for each different recognized object, and may be selected within a limited number for each object having the same identifier. The limited number may be set to 1, but is not limited thereto, and may be set to 2 or more. Selecting only one main object for a specific object is advantageous in terms of computational load or transmission overhead, while selecting a plurality of main objects for a specific object has an advantage that the image reception device 200 may select a better main object later.

Here, the metadata used to calculate the score includes a plurality of metadata. Specifically, the main object selection unit 150 may calculate the score (y) as a weighted sum obtained by multiplying the plurality of metadata by respective weights and then summing multiplication result values as represented in the following Equation 1.

$$y = \sum_i \alpha_i x_i \quad \text{[Equation 1]}$$

Here, i is the number of metadata, $x_i$ refers to each of the plurality of metadata, and $\alpha_i$ refers to a weight corresponding to each metadata. The weight $\alpha_i$ is a value between 0 and 1. For example, $\alpha_i$ may be set differently by a user depending on the type of the object, the property of the object, and an environmental situation such as day/night.

The following Equation 2 is satisfied.

$$\sum_i \alpha_i = 1 \quad \text{[Equation 2]}$$

For example, when $x_i$, which is each of the plurality of metadata, includes the type of the object, the probability of the object, the property of the object, the sub-property of the object, the appearance time of the object, and the size of the object, i will be 6. In this case, the score (y) is determined as a value obtained by multiplying the respective metadata by weights and then summing multiplication result values. In this case, the user may change a condition for selecting the main object by increasing a weight of relatively important metadata among several metadata such as the type of the object, the probability of the object, and the property of the object and decreasing a weight of relatively less important metadata among the several metadata. As described above, the weight ($\alpha_i$) may be changed according to a user's intention or situation, and a weight of unnecessary metadata may be set to 0.

The user may input specific metadata to be used to calculate the score (y), a value to be used as the weight, or a size of the reference value compared with the score (y), through the condition selection unit 180. Since a criterion for selecting the main object changes through such a change of the selection condition, the selected main object and the image frame including the main object will also be different.

Figure 3:
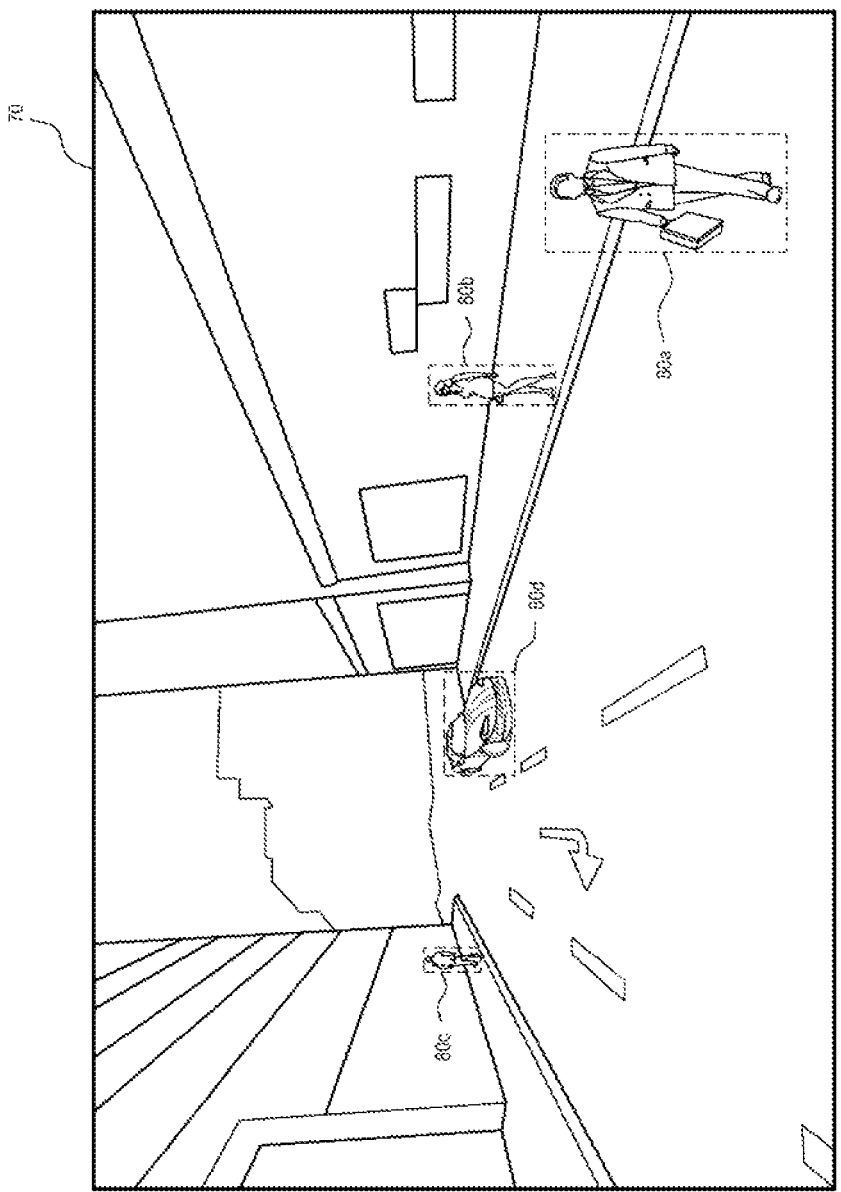
FIG. 3 is a diagram illustrating an example of an image frame including objects according to an exemplary embodiment of the present disclosure.

FIG. 3 is a diagram illustrating an example of an image frame 70 including objects 80a, 80b, 80c, and 80d according to an exemplary embodiment of the present disclosure. The image frame 70 includes a street scene including a road and buildings, and includes a plurality of objects 80a, 80b, 80c, and 80d.

The object recognition unit 130 may identify areas of the objects 80a, 80b, 80c, and 80d from such an image frame 70. In addition, the metadata generation unit 140 generates metadata indicating types, properties, probabilities, appearance times, sizes, and the like, of such objects 80a, 80b, 80c, and 80d. Even though the plurality of objects 80a, 80b, 80c, and 80d are included in one image frame 70 as described above, all of the objects 80a, 80b, 80c, and 80d are not selected as main objects.

The main object selection unit 150 calculates a score (y) for each object according to Equation 1, and selects a corresponding object as the main object only when the score (y) exceeds a reference value. In this case the main object may be changed depending on the number of metadata or a weight. For example, when a high weight is applied to the size of the object, a relatively large object 80a is likely to be selected as the main object, and when a high weight is applied to the property of the object such as a female, a female object 80b is likely to be selected as the main object. Alternatively, when a high weight is applied to the type of the object such as a vehicle, a vehicle object 80d is likely to be selected as the main object. As such, the present disclosure allows the main object to be selected appropriately for a situation by changing the criterion for selecting the main object. A plurality of main objects having different identifiers may also be selected within one image frame 70.

Such a main object selection condition may be directly input by a user of the image transmission device 100, but may also be automatically determined by a current resource state of the image transmission device 100 measured by the resource monitor 175 or a back-end request received from the image reception device 200.

First, the resource monitor 175 may monitor a current resource (e.g., central processing unit (CPU) usage, memory usage, storage medium usage, etc.) of the image transmission device 100 and provide a monitoring result to the condition selection unit 180, and the condition selection unit 180 may change the main object selection condition based on the current resource. For example, when the current resource is insufficient, the main object selection unit 150 may decrease the complexity of calculation to be recognized by the object recognition unit 130 and a load for generating the metadata in the metadata generation unit 140 as well as decrease an amount of calculation for selecting the main object by reducing the number of metadata used to calculate the score (y).

Alternatively, when the communication unit 170 receives a back-end request including the main object selection condition from the image reception device 200, the condition selection unit 180 may change the metadata used to calculate the score (y), the weight, or the reference value based on the received main object selection condition. In this case, the score (y) is calculated only with necessary levels of metadata and weights according to performance or a purpose of the image reception device 200. That is, the main object is determined in a scalable scheme according to a request of the image reception device 200 requiring the main object.

Meanwhile, the back-end request received from the image reception device 200 may further include a metadata selection condition or an image selection condition as well as the main object selection condition.

The condition selection unit 180 may determine a metadata set including all or some of the metadata generated by the metadata generation unit 140 according to the metadata selection condition and transfer the metadata set to the communication unit 170. In this case, the communication unit 170 transmits the determined metadata set to the image reception device 200. As such, when only the metadata set requested by the image reception device 200 among all the metadata generated by the metadata generation unit 140 is transmitted, a network load may be decreased in that metadata other than the metadata set to be utilized by the image reception device 200 are not transmitted.

In addition, the condition selection unit 180 may determine whether to transmit an image frame itself extracted by the frame extraction unit 160 or generate and transmit a best shot from the image frame including the main object to the image reception device 200 according to the image selection condition, and transfer a determination result to the frame extraction unit 160. The "best shot" as used herein refers to a partial image (e.g., a bounding box image including the main object) cropped from the image frame including the selected main object and including at least the main object.

When it is determined to transmit the image frame itself, the frame extraction unit 160 transfers the extracted image frame to the communication unit 170, and when it is determined to transmit the best shot, the frame extraction unit 160 generates the best shot from the extracted image frame through an image cropper 165 and transmits the best shot to the communication unit 170. When the best shot is generated by the image cropper 165, the metadata generated by the metadata generation unit 140 is used.

Meanwhile, the frame extraction unit 160 extracts an image frame including the main object from among image frames encoded by the video encoder 115. The image frame is one of still images included in the video, and may be stored as a JPEG image file. However, it is preferable that the image frame is selected among key frames that may be reconstructed without referring to other frames. Otherwise, other information is further required when the image reception device 200 reads the image frame later, which is inefficient in terms of a processing speed and data transmission amount. As such, the image frame may be a key frame included in a video compressed by the video encoder 115. However, the present disclosure is not limited thereto, and it is also possible to provide an uncompressed version of an image frame provided from the image input unit 110 to image reception device 200.

The user input device 255 may include various input means such as a keyboard, a mouse, a touch pad, a digitizer, and a voice recognition command.

The communication unit 170 receives a main back-end request from the image reception device 200 and provides the main back-end request to the condition selection unit 180, as described above. The back-end request may include one or more of the main object selection condition, the metadata selection condition, and the image selection condition, as described above.

In addition, the communication unit 170 may transmit the metadata set selected by the condition selection unit 180 among the metadata on the main object generated by the metadata generation unit 140 to the image reception device 200. In addition, the communication unit 170 may transmit the image frame including the main object extracted by the frame extraction unit 160 or the best shot included in the image frame to the image reception device 200 according to the determination of the condition selection unit 180.

Figure 4:
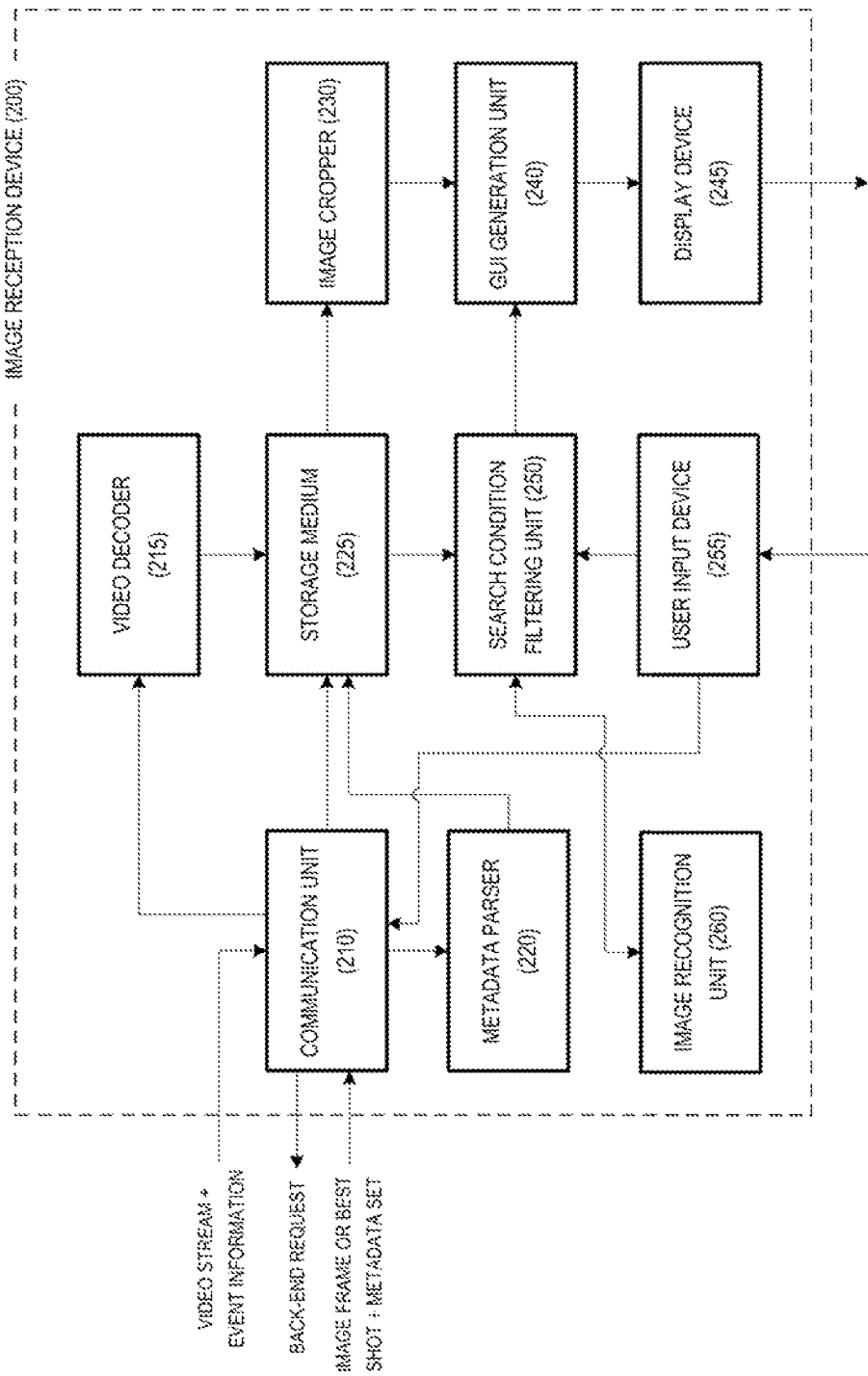
FIG. 4 is a block diagram illustrating components of an image reception device according to an exemplary embodiment of the present disclosure.

FIG. 4 is a block diagram illustrating components of an image reception device 200 according to an exemplary embodiment of the present disclosure.

The image reception device 200 is configured to include a processor and a memory storing instructions executable by the processor in terms of hardware, and is communicatively connected to the image transmission device 100 through the network 10, as described above. The image reception device 200 may be implemented in various back-end devices capable of communicating with the image transmission device 100, such as a cloud server or a network video recorder (NVR) for image surveillance.

Referring to FIG. 4, for example, the image reception device 200 may be configured to include a communication unit 210, a video decoder 215, a metadata parser 220, a storage medium 225, an image cropper 230, a graphic user interface (GUI) generation unit 240, a display device 245, a search condition filtering unit 250, a user input device 255, and an image recognition unit 260.

The communication unit 210 is an interface communicatively connected to the image transmission device 100 to receive a video stream, and may be configured to include a transmission control protocol/Internet protocol (TCP/IP), a real-time streaming protocol (RTSP), a physical layer, and the like. The communication unit 210 may receive a normal video stream and event information from the image transmission device 100 through the TCP/IP, the RTSP, the physical layer, and the like.

Meanwhile, the communication unit 210 may transmit the back-end request including the main object selection condition, the metadata selection condition, or the image selection condition to the image transmission device 100 according to a user command input through the user input device 255.

The user input device 255 may include various input means such as a keyboard, a mouse, a touch pad, a digitizer, and a voice recognition command. In this case, since the calculation of the score (y) in the image transmission device 100 is changed depending on the main object selection condition, the image frame including the main object, received from the image transmission device 100 may be also variably selected.

In addition, the communication unit 210 may receive a changed metadata set from the image transmission device 100 according to the metadata selection condition. In addition, the communication unit 210 may receive the image frame itself including the main object or receive the best shot cropped from the image frame, from the image transmission device 100 according to the image selection condition.

The video decoder 215 decodes the compressed video stream to reconstruct a visually confirmable image frame. Such decoding of the video decoder 215 is an inverse process of the encoding of the video encoder 115 described above. The reconstructed image frame as described above may be stored in the storage medium 225 and may be used when searching for a video later. The storage medium 225 may be implemented as various memory means such as a random access memory (RAM), a read only memory (ROM), a hard disk, a solid state drive (SSD), and a memory card.

The metadata parser 220 parses a plurality of metadata in the received metadata set in a prescribed format. Such a parsing process is a process of reading a specific number of bit values in a prescribed format. The metadata parsed by the metadata parser 220 may also be stored in the storage medium 225.

The image cropper 230 crops a partial image occupied by the main object in the image frame using the metadata on the main object to generate a best shot. Since the metadata includes size and position information of the main object within the image frame, cropping is possible at an accurate position through the metadata. When the best shot has already been provided from the image transmission device 100, such a cropping process may be omitted. A resizing process may be further included in addition to the cropping process in order to dispose the best shot on a screen in an appropriate size.

As compared with a case where the image transmission device 100 directly performs cropping and the image reception device 200 receives the cropped best shot from the image transmission device 100, when the image reception device 200 crops the best shot using the metadata as described above, there is an advantage that a calculation load in the image transmission device 100, in particular, a camera device having low specifications may be decreased.

Furthermore, as compared with a case where the image reception device 200 simply receives the best shot occupied by the main object, when the image reception device 200 receives the entire image frame including the main object, a more precise post-search is possible through additional information of the image frame.

The GUI generation unit 240 generates a graphic user interface in which the best shots received from the image transmission device 100 and/or a limited number of best shots (e.g., one best shot) generated by the image cropper 230 are collected for each object having a different identifier. The generated graphic user interface may be displayed on a screen through the display device 245.

Figure 5:
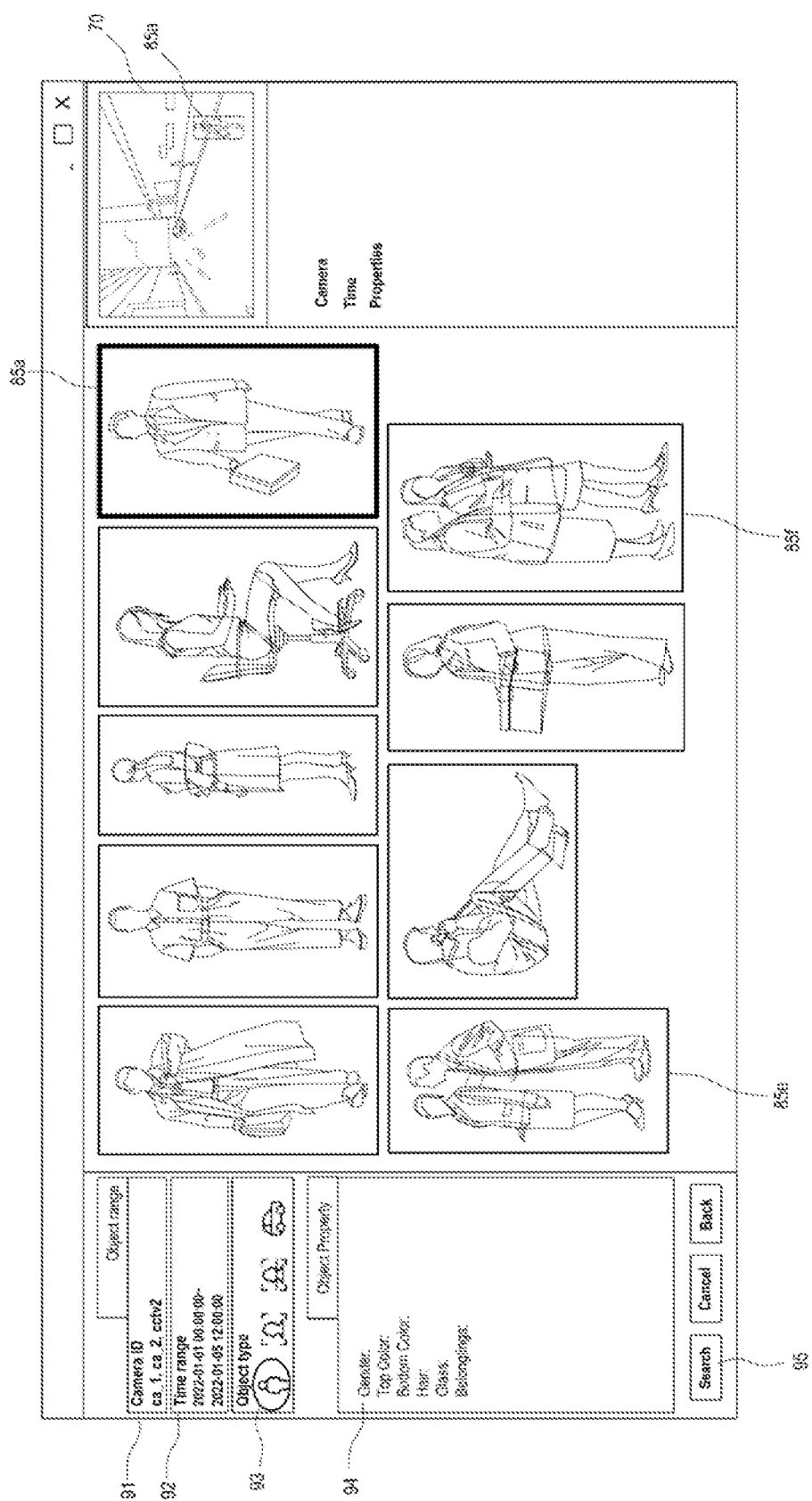
FIG. 5 is a diagram illustrating an example of a graphic user interface displayed on a screen of the image reception device.

FIG. 5 is a diagram illustrating an example of a graphic user interface 90 displayed on a screen of the image reception device 200. For example, the graphic user interface 90 may display a plurality of main objects having different identifiers at the center thereof. The respective main objects are best shots best representing objects of corresponding identifiers.

Such main objects may be single objects, but may also be object groups 85e and 85f including two or more objects existing (disposed at close positions) within a predetermined distance for a predetermined time or more.

When a user selects one best shot from among the best shots of the plurality of main objects as described above, an image frame 70 including the corresponding main object 85a may be displayed together. Accordingly, the user may immediately confirm an environment in which the main object 85a is extracted. In addition, when the user clicks the image frame 70, the graphic user interface may additionally include a screen on which a video including the image frame is reproduced. For example, the video may be reproduced for a predetermined time interval before and after a temporal position of the image frame. Accordingly, the user may intuitively search for a representative image of the main object 85a, the image frame 70 including the main object 85a, and the video including the image frame 70.

Here, the search condition filtering unit 250 may filter some of the main objects displayed on the graphic user interface 90 according to an object search condition input through the user input device 255. The object search condition includes, for example, one or more of a type of a network camera (Camera ID) 91, a time range (Time range) 92 in which the main object appears, a type of the main object (Object type) 93, and a property of the main object (Object Property) 94. Here, the type of the main object may be a person, and the property of the main object may include a gender, a top color, a bottom color, a hair, a glass, belongings, and the like.

The user may apply the filtering result by pressing a search button 95 of the graphic user interface 90. As a result, the screen on which all main objects are displayed is changed to display only the main objects satisfying the object search condition.

As another exemplary embodiment, the user may additionally input an environmental condition of the image frame including the best shots of the main objects together with the object search condition through the user input device 255. In this case, the search condition filtering unit 250 may apply an additional condition (e.g., an environmental condition) that may be obtained from the image frame including the main objects as well as the object search condition as filtering conditions.

For example, the environmental condition may include a place (e.g., a street, an office, a home, a concert hall, etc.), illuminance (e.g., a bright background or a dark background), a time (e.g., day or night), and the like. When such an environmental condition and the object search condition are applied together, more detailed condition filtering is possible. In the present disclosure, the image reception device 200 receives not only the best shots of the main objects but also the entire image frame, and thus, the environmental condition may be further added in searching for the main object as described above. To this end, the image recognition unit 260 performs image analysis on the image frame including the main objects to decide whether or not the environmental condition is satisfied. Such image analysis may be performed through video analysis based on artificial intelligence or an object classification (foreground/background separation) algorithm, similar to the object recognition described above.

Meanwhile, as another exemplary embodiment, the image transmission device 100 does not transmit the image frame including the main object and the best shot to the image reception device 200, and may simply transmit only the metadata set to the image reception device. In this case, the image frame including the main object has not been received, and thus, the image cropper 230 needs to generate the best shot from the reconstructed video stream decoded by the video decoder 215 and stored in the storage medium 225. Accordingly, in this case, the metadata set further includes a frame identifier of a specific image frame within the video stream. The image cropper 230 may read a corresponding image frame in the storage medium 225 using the frame identifier and then generate the best shot using size and position information of the main object included in the metadata set.

Figure 6:
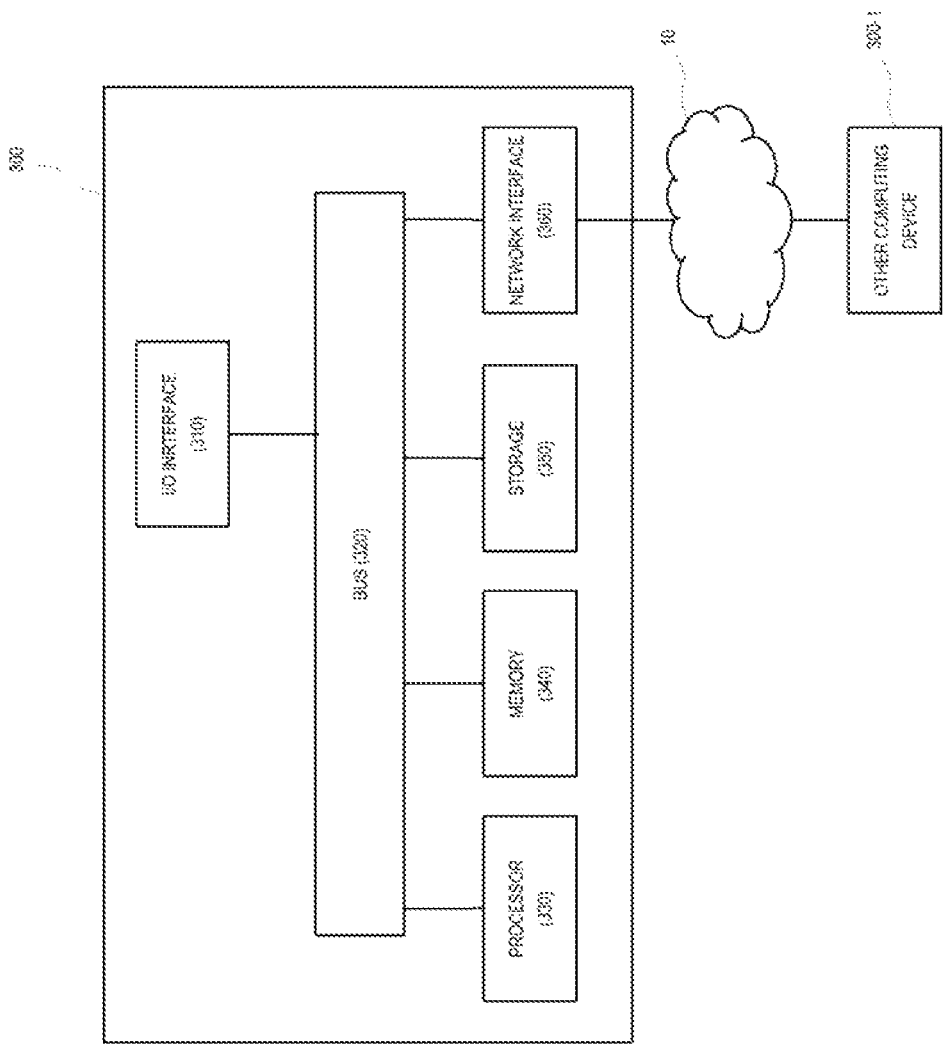
FIG. 6 is a block diagram illustrating the hardware configuration of a computing device that implements the image transmission device in FIG. 2 and the image reception device in FIG. 4.

FIG. 6 is a block diagram illustrating the hardware configuration of a computing device that implements the image transmission device 100 in FIG. 2 and the image reception device in 200 in FIG. 4.

Referring to FIG. 6, a computing device 300 includes a bus 320, a processor 330, a memory 340, a storage 350, an input/output interface 310, and a network interface 360. The bus 320 is a path for the transmission of data between the processor 330, the memory 340, the storage 350, the input/output interface 310, and the network interface 360. However, it is not particularly limited how the processor 330, the memory 340, the storage 350, the input/output interface 310, and the network interface 360 are connected. The processor 330 is an arithmetic processing unit such as a central processing unit (CPU) or a graphics processing unit (GPU). The memory 340 is a memory such as a random-access memory (RAM) or a read-only memory (ROM). The storage 350 is a storage device such as a hard disk, a solid-state drive (SSD), or a memory card. The storage 350 may also be a memory such as a RAM or a ROM.

The input/output interface 310 is an interface for connecting the computing device 300 and an input/output device. For example, a keyboard or a mouse is connected to the input/output interface 310.

The network interface 360 is an interface for communicatively connecting the computing device 300 and an external device to exchange transport packets with each other. The network interface 360 may be a network interface for connection to a wired line or for connection to a wireless line. For example, the computing device 300 may be connected to another computing device 300-1 via a network 10.

The storage 350 stores program modules that implement the functions of the computing device 300. The processor 330 implements the functions of the computing device 300 by executing the program modules. Here, the processor 330 may read the program modules into the memory 340 and may then execute the program modules.

The hardware configuration of the computing device 300 is not particularly limited. For example, the program modules may be stored in the memory 340. In this example, the computing device 300 may not include the storage 350.

The image transmission device 100 and the image reception device 200 may at least include the processor 330 and the memory 340, which stores instructions that can be executed by the processor 330. In particular, they can be driven by executing instructions including a variety of functional blocks or steps via the processor 330.

Figure 7A:
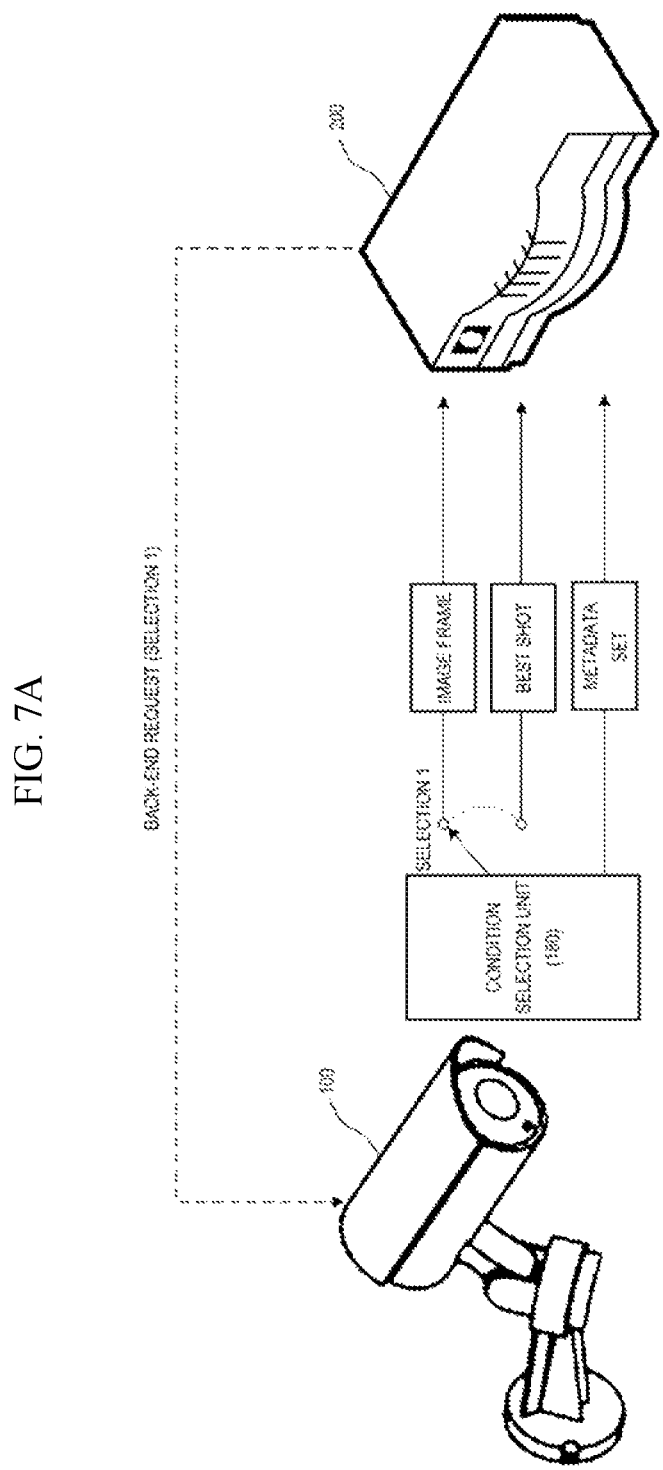
FIGS. 7A and 7B are diagrams illustrating scenarios in which the image transmission device selects and transmits one of an image frame including a main object and a best shot.

Hereinafter, FIGS. 7A to 9B are diagrams illustrating various scenarios in which methods according to an exemplary embodiment of the present disclosure may be performed. First, FIGS. 7A and 7B are diagrams illustrating scenarios in which the image transmission device 100 selects and transmits one of an image frame including a main object and a best shot.

Referring to FIG. 7A, the image reception device 200 transmits a back-end request to the image transmission device 100. The back-end request includes the image selection condition described above. In this case, the condition selection unit 180 of the image transmission device 100 selects one of the image frame including the main object and the best shot according to the image selection condition and transmits the selected one to the image reception device 200. In this case, a predetermined metadata set is transmitted to the image reception device 200 without a separate selection of the metadata set.

As such, when the image reception device 200 may transfer a request for selecting one of the image frame including the main object and the best shot, an advantageous case of a case of receiving the image frame and processing the image frame to generate the best shot (in this case, more information may be obtained) and a case of receiving a processed best shot from the image transmission device 100 (in this case, a resource burden is relatively low) may be selected according to specifications of the image reception device 200 or a current resource use state.

Figure 7B:
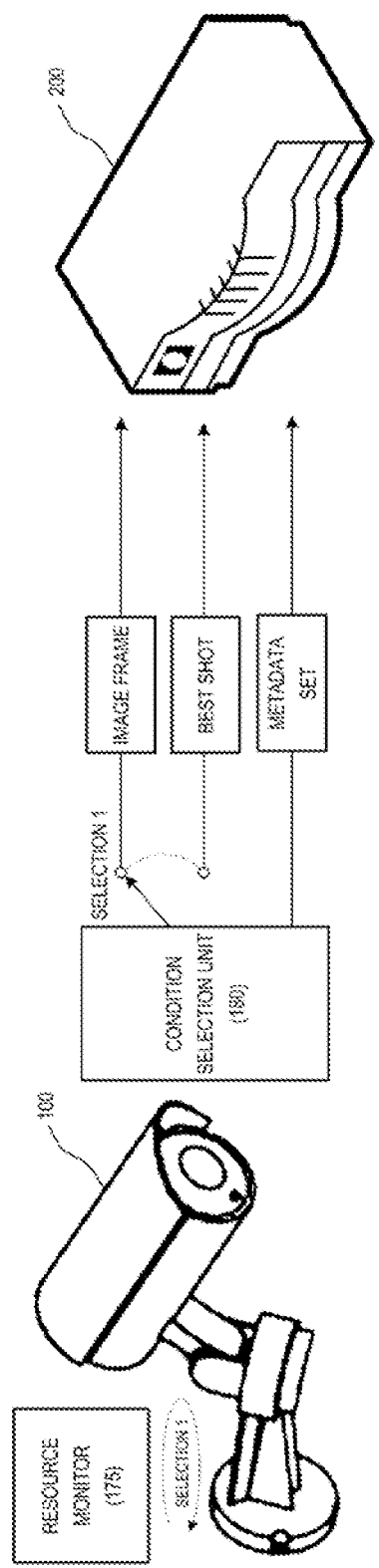

When FIG. 7B is compared with FIG. 7A, the image transmission device 100 does not receive the back-end request from the image reception device 200, and the resource monitor 175 of the image transmission device 100 itself determines the image selection condition by confirming a current resource use state. Accordingly, the image transmission device 100 may transmit the image frame itself including the main object to the image reception device 200 when a resource is insufficient and generate the best shot from the image frame and transmit the best shot to the image reception device 200 when the resource is sufficient, according to the current resource use state.

In this case, when the image reception device 200 is a device that does not include an AI processor, AI-based additional analysis is not possible, but the image reception device 200 may utilize the received image frame to search for an event capable of recognizing the entire situation, and may utilize a function capable of searching for only a specific object such as a license plate image or a face detection image when it receives the best shot.

Figure 8A:
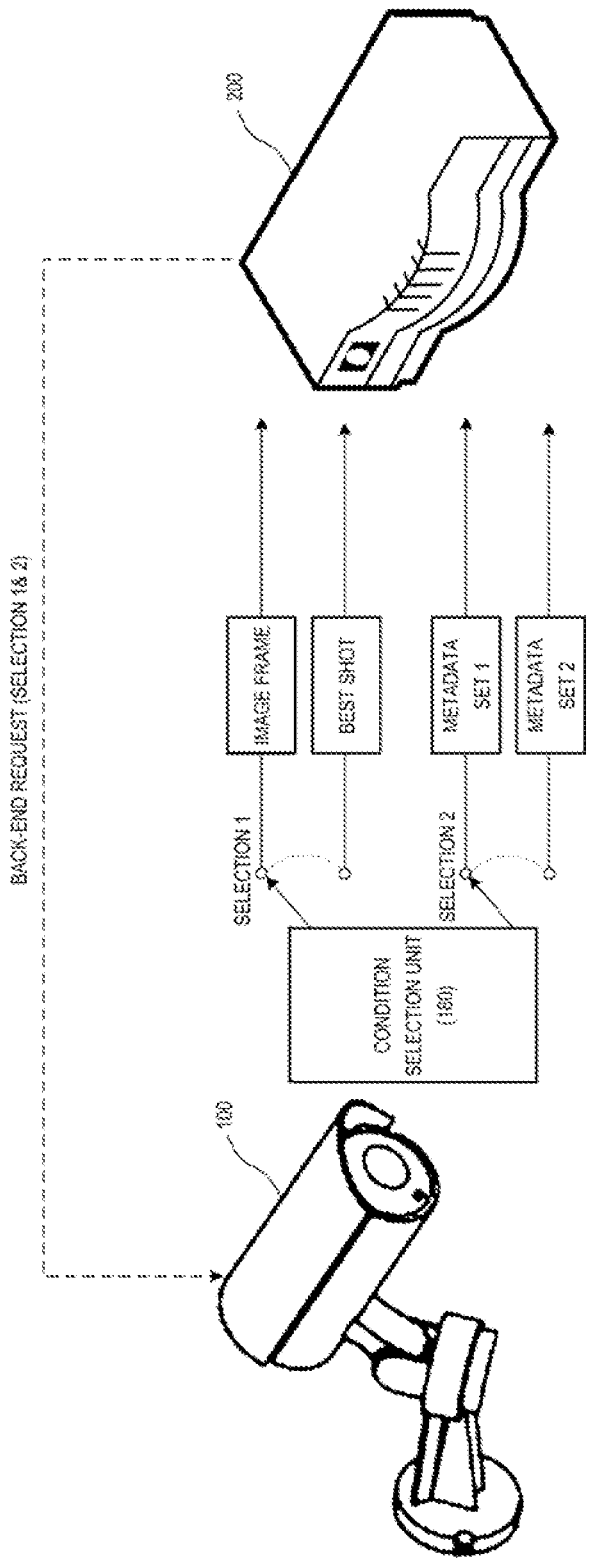
FIGS. 8A and 8B are diagrams illustrating scenarios in which the image transmission device selects one of an image frame including a main object and a best shot and selects one of various metadata sets.
Figure 8B:
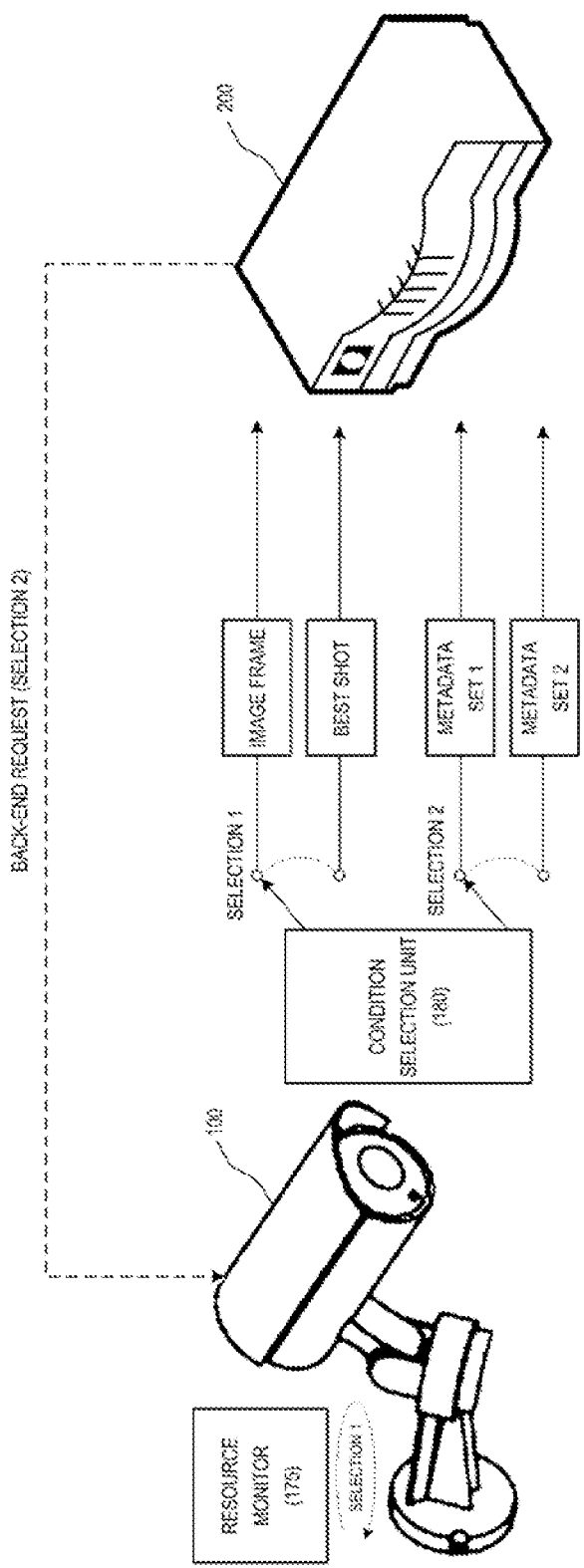

Next, FIGS. 8A and 8B are diagrams illustrating scenarios in which the image transmission device 100 selects one of an image frame including a main object and a best shot (selection 1) and selects one of various metadata sets (selection 2).

When FIGS. 8A and 8B are compared with FIGS. 7A and 7B, in addition to the selection 1 regarding the image selection condition, a selection 2 process regarding the metadata selection condition is added.

That is, FIG. 8A illustrates a scenario in which both the image selection condition (selection 1) and the metadata selection condition (selection 2) are received through a back-end request of the image reception device 200.

In this case, the condition selection unit 180 selects one of the image frame including the main object and the best shot through the image selection condition and transmits the selected one to the image reception device 200, and selects a plurality of metadata sets (set 1 and set 2) and transmits the selected metadata set to the image reception device 200. As such, when only the metadata set requested by the image reception device 200 among all the metadata generated by the metadata generation unit 140 is transmitted, a network load may be decreased in that metadata other than the metadata set to be utilized by the image reception device 200 are not transmitted. For example, when the image reception device 200 wants information related to a traffic solution, the image transmission device 100 may extract only metadata necessary for analyzing/searching/storing the traffic solution and transmit the extracted metadata to the image reception device 200.

Meanwhile, when FIG. 8B is compared with FIG. 8A, FIG. 8B is the same as FIG. 8A in that the metadata selection condition (selection 2) is received from the image reception device 200, but is different from FIG. 8A in that the resource monitor 175 of the image transmission device 100 itself determines the image selection condition (selection 1) by confirming a current resource use state.

Figure 9A:
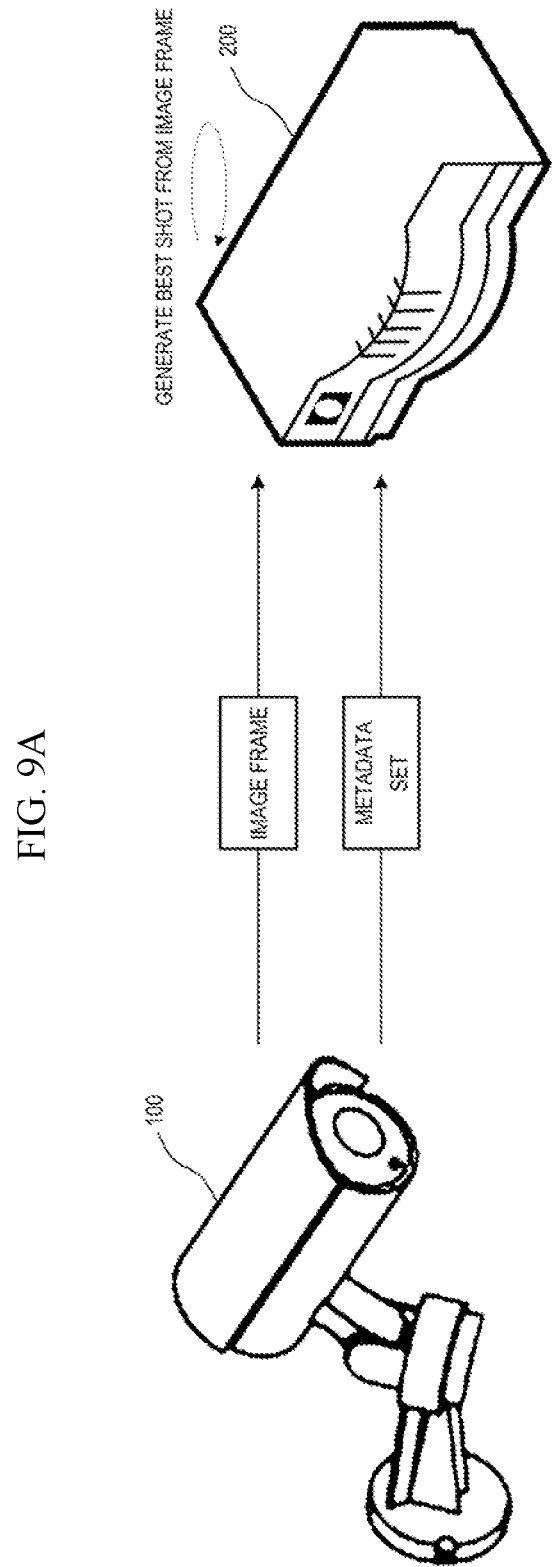
FIGS. 9A and 9B are diagrams illustrating scenarios in which the image transmission device transmits an image frame including a main object and/or a metadata set without a selection process.
Figure 9B:
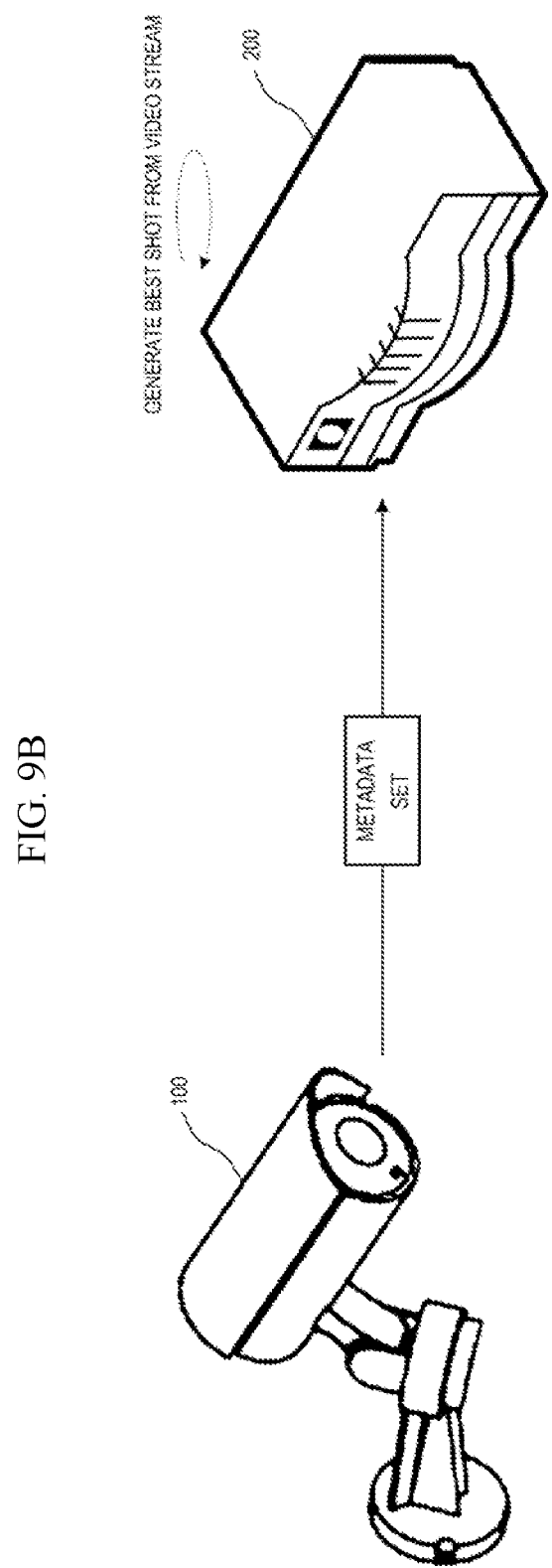

FIGS. 9A and 9B are diagrams illustrating scenarios in which the image transmission device 100 transmits an image frame including a main object and/or a metadata set without the selection process described above.

Referring to FIG. 9A, the image transmission device 100 transmits the image frame including the main object and the metadata set to the image reception device 200 uniformly according to a fixed criterion. That is, a case where the image transmission device 100 does not have the variable image frame/best shot selection and metadata set selection function as described above is illustrated. In this case, the image reception device 200 may generate the best shot from the image frame using the metadata set.

FIG. 9B illustrates a scenario in which the image transmission device 100 does not transmit the image frame or the best shot, and simply transmits only a fixed metadata set to the image reception device 200. In this case, since the image reception device 200 does not receive the image frame including the main object, the image reception device 200 acquires the image frame from the video stream itself and generates the best shot from the image frame using the metadata set. In this case, the metadata set should further include a frame identifier for identifying the image frame. The image reception device 200 may acquire the image frame from the video stream using the frame identifier.

In this case, it may be assumed that the image transmission device 100 does not include an AI processor and the image reception device 200 includes an AI processor. The image transmission device 100 may not generate AI information, but may transmit a position determined to be most meaningful using motion information and an image frame (key frame) for the position to the image reception device 200. In this case, the image reception device 200 may additionally analyze an AI property using the transmitted motion information and key frame, and show the key frame as a search result. In addition, additionally, the image reception device 200 may extract the best shot through cropping/resizing processes and provide additionally analyzed AI information to the user together with the search result.

In addition, it may be assumed that both the image transmission device 100 and the image reception device 200 do not have an AI processor. In this case, when the image transmission device 100 provides the image frame (key frame) as illustrated in FIG. 9A, the image reception device 200 may perform an event search based on the key frame. In addition, when the image transmission device 100 does not provide the key frame as illustrated in FIG. 9B, the image reception device 200 may perform a search based on the metadata set (generated based on the motion information).

Figure 10:
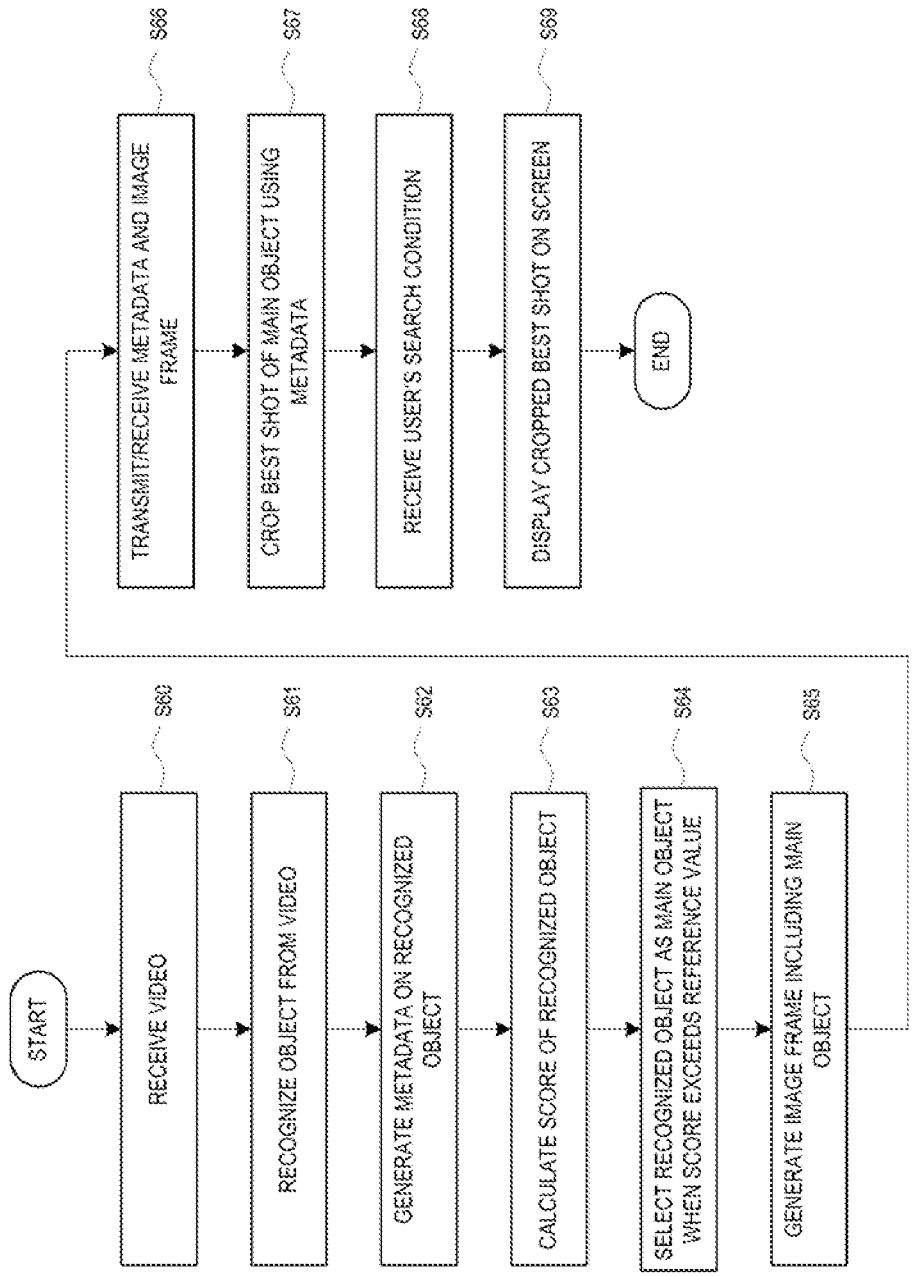
FIG. 10 is a schematic flowchart illustrating an image surveillance method performed in the image surveillance system according to an exemplary embodiment of the present disclosure.

FIG. 10 is a schematic flowchart illustrating an image surveillance method performed in the image surveillance system 150 according to an exemplary embodiment of the present disclosure. The image surveillance system 150 refers to the entire system including the image transmission device 100, the image reception device 200, and the network 10.

First, the image transmission device 100 includes a processor and a memory for storing instructions executable by the processor, and performs receiving a video (S60), recognizing an object from the received video (S61), generating metadata of the recognized object (S62), calculating a score of the recognized object using the generated metadata (S63), selecting the recognized object as a main object when the score exceeds a reference value (S64), and generating the metadata on the selected main object and an image frame including the main object in the video (S65), by the instructions.

The metadata and the image frame including the main object that are generated as described above are transmitted to the image reception device 200 through the network 10 (S66).

The image reception device 200 includes a processor and a memory storing instructions executable by the processor, and performs cropping a best shot occupied by the main object in the image frame using the metadata of the main object (S67), receiving a user's search condition (S68), and displaying the cropped best shot on a screen (S69) according to the user's search condition, by the instructions.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

EXPLANATION OF NUMBER

10: network
50: network camera
70: image frame
80: recognized object
85: main object
90: graphic user interface
100: image Transmission Device
105: image capturing element
110: image input unit
115: video encoder
120: video streamer
130: object recognition unit
140: metadata generation unit
150: main object selection unit
160: frame extraction unit
170, 210: communication unit
175: resource monitor
180: condition selection unit
200: image reception device
215: video decoder
220: metadata parser
225: storage medium
230: image cropper
240: GUI generation unit
245: display device
250: search condition filtering unit
255: user input device
260: image recognition unit

The invention claimed is:

1. An image transmission method performed by instructions in an image transmission device including a processor and a memory storing the instructions executable by the processor, the image transmission method comprising:
receiving a video;
recognizing an object from the received video;
generating metadata of the recognized object;
calculating a score of the recognized object using the generated metadata;
selecting the recognized object as a main object when the score exceeds a reference value;
transmitting the metadata on the selected main object; and
transmitting one of an image frame including the main object in the video and a best shot cropped from the image frame,
wherein at least one of the reference value, the metadata, and weights is changed according to a back-end request received from an image reception device connected to the image transmission device through a network, and
wherein the selected main object is changed from an object to another object in the image frame according to the change of the at least one of the reference value, the plurality of metadata, and the weights.

2. The image transmission method of claim 1, wherein the recognizing of the object includes recognizing the object through motion sensing or artificial intelligence learning.

3. The image transmission method of claim 1, wherein the main object is selected for each different recognized object, and
the metadata includes an identifier for identifying identity of the main object.

4. The image transmission method of claim 3, wherein the main object is selected within a limited number for each object having the same identifier.

5. The image transmission method of claim 1, wherein the image frame is a key frame included in the video, and
the key frame is a frame reconstructed without referring to other image frames.

6. The image transmission method of claim 1, wherein the metadata used to calculate the score includes a plurality of metadata, and the score is calculated as a weighted sum obtained by multiplying the plurality of metadata by respective weights and then summing multiplication result values.

7. The image transmission method of claim 1, wherein the metadata include one or more of a probability of the object, a type of the object, a property of the object, a sub-property of the object, an appearance time of the object, and a size and a position of the object.

8. The image transmission method of claim 1, wherein at least one of the reference value, the metadata, and the weights is changed according to a current resource of the image transmission device or a back-end request received from an image reception device connected to the image transmission device through a network.

9. The image transmission method of claim 1, wherein a set of the transmitted metadata is changed according to a current resource of the image transmission device or a back-end request received from an image reception device connected to the image transmission device through a network.

10. The image transmission method of claim 1, wherein one of the image frame including the main object and the best shot is selected according to a current resource of the image transmission device or a back-end request received from an image reception device connected to the image transmission device through a network and is transmitted to the image reception device.

11. An image display method performed by instructions in an image reception device including a processor and a memory storing the instructions executable by the processor, the image display method comprising:
receiving metadata on a main object selected in an image transmission device connected to the image reception device through a network;
receiving one of an image frame including the main object in a video obtained by the image transmission device or a best shot cropped from the image frame;
generating a best shot by cropping a partial image occupied by the main object in the image frame using the metadata on the main object when the image frame including the main object is received; and
displaying at least one of the received best shot and the cropped best shot on a screen,
wherein the method further comprises transmitting a back-end request to the image transmission device,
wherein the image frame including the main object, received from the image transmission device is changed from a first image frame to a second image frame according to the back-end request, and
wherein the first image frame includes an object as the main object and the second image frame includes another object as the main object.

12. The image display method of claim 11, wherein the metadata includes an identifier for identifying identity of the main object, and the displaying includes collecting a limited number of partial images for each object having a different identifier and displaying the collected partial images on the screen.

13. The image display method of claim 12, further comprising:
receiving an object search condition from a user; and
filtering only partial images satisfying the object search condition among the partial images and displaying the filtered partial images on the screen.

14. The image display method of claim 11, further comprising:
receiving an object search condition and an environment condition from a user; and
filtering the partial image and displaying the filtered partial image on the screen when the partial image satisfies the object search condition and the image frame including the partial image satisfies the environment condition.

15. The image display method of claim 11, further comprising performing image analysis in order to identify identity of the main object,
wherein the displaying includes collecting a limited number of partial images for each object having a different identifier and displaying the collected partial images on the screen.

16. The image display method of claim 11, further comprising transmitting a back-end request to the image transmission device,
wherein a set of the metadata received from the image transmission device is changed according to the back-end request.

17. The image display method of claim 11, further comprising transmitting a back-end request to the image transmission device,
wherein it is determined whether the image frame including the main object is received or the best shot is received from the image transmission device according to the back-end request.

* * * * *